(12) United States Patent
Pantos

(10) Patent No.: US 9,628,833 B2
(45) Date of Patent: Apr. 18, 2017

(54) MEDIA REQUESTS FOR TRICKPLAY

(71) Applicant: Apple Inc., Cupertino, CA (US)

(72) Inventor: Roger N. Pantos, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 155 days.

(21) Appl. No.: 14/292,072

(22) Filed: May 30, 2014

(65) Prior Publication Data

US 2015/0350700 A1 Dec. 3, 2015

(51) Int. Cl.
*H04N 21/2387* (2011.01)
*H04N 7/173* (2011.01)
*H04N 21/472* (2011.01)
*H04L 29/06* (2006.01)
*H04L 29/08* (2006.01)
*H04N 21/63* (2011.01)
*H04N 21/6587* (2011.01)

(52) U.S. Cl.
CPC ... *H04N 21/2387* (2013.01); *H04L 29/06095* (2013.01); *H04L 67/02* (2013.01); *H04N 7/17318* (2013.01); *H04N 21/47202* (2013.01); *H04N 21/47217* (2013.01); *H04N 21/631* (2013.01); *H04N 21/6587* (2013.01)

(58) Field of Classification Search
CPC .................................................. H04N 21/2387
See application file for complete search history.

(56) References Cited

U.S. PATENT DOCUMENTS

| 7,962,942 | B1 | 6/2011 | Craner |
| 8,365,235 | B2 | 1/2013 | Hunt et al. |
| 2008/0168133 | A1 | 7/2008 | Osborne |
| 2011/0116772 | A1 | 5/2011 | Kwon et al. |
| 2012/0331106 | A1* | 12/2012 | Ramamurthy . H04N 21/234327 709/218 |
| 2013/0336638 | A1* | 12/2013 | Fork ................... H04N 21/2387 386/278 |
| 2014/0003516 | A1* | 1/2014 | Soroushian ........ H04N 21/2387 375/240.13 |
| 2014/0029913 | A1 | 1/2014 | Lopez et al. |
| 2015/0304714 | A1* | 10/2015 | Park .................... H04L 65/4092 725/88 |

OTHER PUBLICATIONS

International Search Report and Written Opinion, mailed Jul. 24, 2015, from corresponding International Application No. PCT/US2015/028056, filed Apr. 28, 2015.
International Patent Application No. PCT/US2015/028056; Int'l Preliminary Report on Patentability; dated Dec. 15, 2016; 7 pages.

* cited by examiner

*Primary Examiner* — Ricky Chin
(74) *Attorney, Agent, or Firm* — Baker Hostetler LLP; Robert L. Hails

(57) ABSTRACT

An embodiment of a method of requesting and receiving a media stream can include, as performed by a computing device, responsive to a control input to control an enhanced playback mode for a media stream, determining a video frame to display in the enhanced playback mode of the media stream; requesting the determined frame from a media source over at least one connection between the computing device and the media source; predicting a second video frame for the enhanced playback mode; and requesting the predicted second frame from the media source over the at least one connection before receiving the determined video frame over the at least one connection.

19 Claims, 7 Drawing Sheets

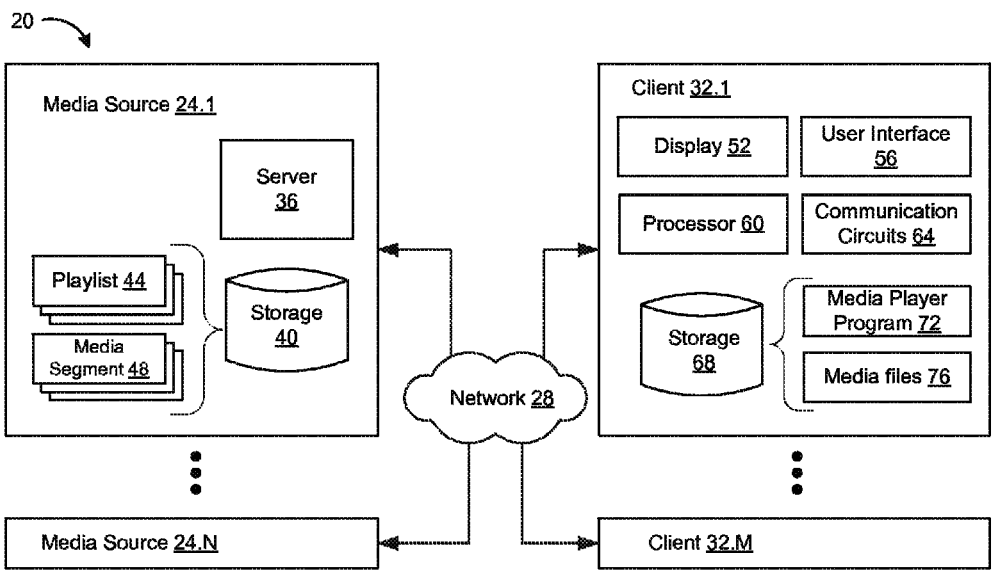
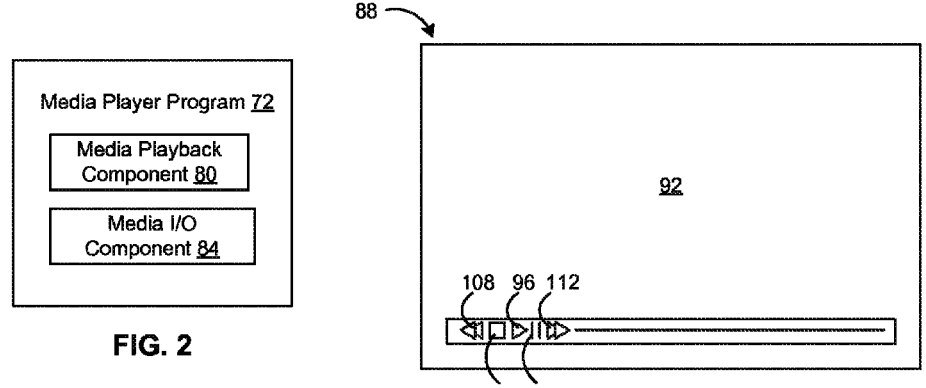
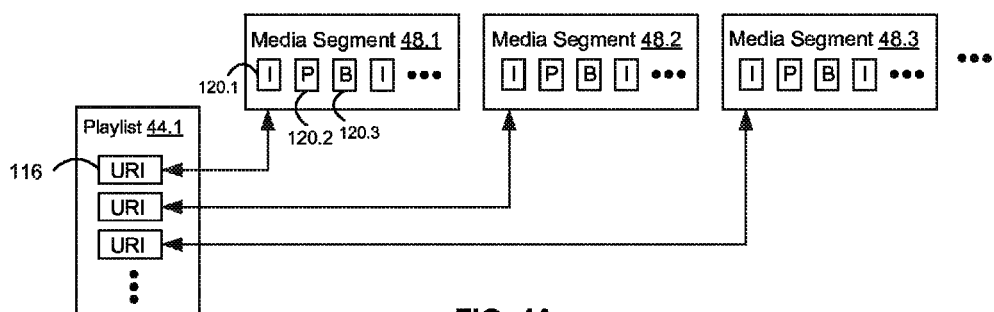

MEDIA REQUESTS FOR TRICKPLAY

BACKGROUND INFORMATION

Streaming digital media from a remote source to a local client over a network is an increasingly popular way of obtaining and viewing media such as video using computers, tablets and smartphones.

When viewing video, users have become accustomed to certain traditional playback control functions such as rewind and fast forward. With relatively older technologies based on locally stored analog media such as video cassettes, these playback modes could be achieved by simply altering the speed or direction of rotation of the cassette. In the context of digital media, such modes are sometimes referred to as trickplay, as they typically approximate but do not actually display each frame of a video in the specified order and/or speed to implement the playback. With digital technologies based on locally stored media, trickplay can be implemented by selecting and displaying at an appropriate speed only certain frames of the locally stored digital media.

However, implementing trickplay playback in a streaming digital media context presents difficulties not encountered when implementing such functions for locally stored media. Digital video frames to be selected and displayed to implement trickplay rewind and fast forward functions typically do not preexist locally upon receiving a corresponding trickplay control input from a user, and must be retrieved from a remote source as part of the streaming process. But characteristics of typical network connections present difficulties in retrieving these frames in a manner compatible with performing trickplay playback in a satisfactory manner. For example, it is typically desirable to perform trickplay playback by displaying selected frames at a selected rate, and each for a selected time, in order to achieve a visual cadence that is pleasing to a viewer. However, retrieving the selected frames over a network often involves variable and unpredictable transmission and latency delays in response to frame requests. Such variable and unpredictable delays have to date rendered trickplay playback for streaming digital media itself variable and unpredictable.

Therefore, a need exists for an improved way of retrieving digital video frames over a network to implement trickplay playback functions for streaming video in a manner that alleviates undesirable effects of variable or unpredictable transmission or latency delays on such playback.

BRIEF DESCRIPTION OF THE DRAWINGS

So that features of the present invention can be understood, a number of drawings are described below. However, the appended drawings illustrate only particular embodiments of the invention and are therefore not to be considered limiting of its scope, for the invention may encompass other equally effective embodiments.

FIG. 1 is a schematic diagram depicting an embodiment of a media streaming system.

FIG. 2 is a schematic diagram depicting an embodiment of a media player program of the media streaming system.

FIG. 3 depicts an embodiment of a portion of user interface provided by the media player program to display and control playback of media streams.

FIGS. 4A-4B are schematic diagrams depicting embodiments of playlist and media segment files.

DETAILED DESCRIPTION OF EXAMPLE EMBODIMENTS

Figure 4B:
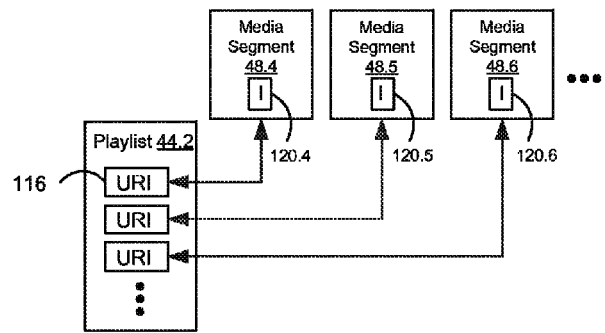

An embodiment of a method of requesting a media stream can include, as performed by a computing device, receiving a control input to control a fast forward or rewind playback mode for the media stream, determining a video frame to display in the fast forward or rewind playback mode, requesting the determined video frame from a media source on a network over at least one connection between the computing device and the media source, predicting a second video frame for the fast forward or rewind playback mode, and requesting the predicted second display frame from the media source over the at least one connection before receiving the determined video frame over the at least one connection.

The method thereby enables an improved trickplay playback mode for media streams by requesting in rapid succession both determined and predicted video frames for the trickplay playback, and therefore eliminating or alleviating undesirable effects of variable or unpredictable delays on such playback by advancing the time at which video frames are requested in comparison to requesting only video frames that have been determined as display frames.

In embodiments of the method, the at least one connection can include at least one Transmission Control Protocol (TCP) connection. Additionally, the requesting of the determined video frame can be performed over a first connection while the requesting of the predicted video frame can be performed over a second connection different than the first connection.

The method can further include determining an additional video frame for the fast forward or rewind playback mode and comparing a frame location in a playback timeline of the predicted video frame with a frame location of the determined additional video frame. If the frame location of the predicted video frame is within a predetermined distance from the frame location of the determined additional video frame, the predicted video frame can be displayed. If the frame location of the predicted video frame is not within a predetermined distance from the frame location of the determined additional video frame, the received predicted video frame can be bypassed or its request aborted and the determined additional video frame can be requested from the media source.

Non-transitory machine-readable media can include program instructions that when executed perform embodiments of this method. A computing device can include a display, a processor, a user interface and a storage component, the storage component including program instructions that when executed by the processor perform embodiments of this method.

FIG. 1 depicts an embodiment of a media streaming system 20 for use in streaming media. The depicted media streaming system 20 can include one or more media sources 24 (e.g., media sources 24.1 . . . 24.N), a communication network 28, and one or more client devices 32 (e.g., client devices 32.1 . . . 32.M).

Each media source 24 can provide a platform to serve media streams to the client devices 32 over the network 28. The media sources 24 can each include a storage component 40 to store a variety of media files and a server component 36 to serve streams based on the stored media files to the client devices 32. The storage component 40 can include one or more of a storage device, computing device, database, etc., configured to store and provide to the sever component media files such as playlist files 44 and media segment files 48. The server component 36 can be a computing device such as a general purpose or specialized computer, and include a processor, communication circuits and computer programs configured to serve media streams based on the stored media files over the network 28 to the client devices 32. In one embodiment, the server component 36 can be a web server.

The communication network 28 can enable communication of data between the media sources 24 and client devices 32, and can include components of one or more of the Internet, communication networks local to the media sources 24, or communication networks local to the client devices 32.

The client devices 32 can each provide a platform for a user to select, receive over the network 28, and display media streams. Each client device 32 can be a computing device such as a desktop computer, laptop computer, tablet computer, or smartphone, and can include a display 52, a user interface 56, a processor 60, communication circuits 64, and a storage component 68, the storage component 68 storing a media player program 72 and media files 76.

FIG. 2 depicts an embodiment of the media player program 72. The media player program 72 can include program instructions that are executable by the processor 60 of the client device 32 to provide a player user interface to media stream functions at the client device 32. The media player program 72 can include a media playback component 80, configured to provide the player user interface and associated functionality to enable the user to select and perform playback functions for media streams as discussed herein, and a media input/output (I/O) component 84, configured to perform media stream requests and receipt of media stream data as discussed herein.

FIG. 3 depicts an embodiment of a portion of the user interface 88 of the media player program 72 provided to perform media stream playback functions. The user interface 88 can include a video display portion 92 to display a video or other visual component of a media stream, and playback controls to receive media stream playback control inputs from the user, including one or more of a normal speed forward playback control 96, a stop playback control 100, a pause playback control 104, a rewind playback control 108, and a fast forward playback control 112.

The media streamed by the media streaming system 20 can include a variety of different types of media and/or multimedia, including one or more of video, audio, or presentations, etc. To provide media streams from the media sources 24 to the client devices 32, the media streaming system 20 can utilize media files embodying the media to be streamed, such as, for example, the playlist and media segment files 44, 48.

FIGS. 4A-4B depict embodiments of the playlist and media segment files 44, 48 for use in producing a media stream including a video component. Each such media stream can be associated with one or more playlist files 44 and a plurality of media segment files 48. Each of the playlist files 44 corresponding to the stream can include an ordered list of pointers 116, such as uniform resource indicators (URIs), that point to the media segment files 48. The media segment files 48 pointed to by the playlist file 44 can include data defining the video of the stream, and can each include data for one or more video frames 120 of the video component of the stream.

Generally speaking, to provide a media stream from one of the media sources 24 to one of the client devices 32 using playlist and media segment files 44, 48, one or more playlist files 44 corresponding to the stream can first be transmitted from the media source 24 to the client device 32. The client device 32 can then request the media segment files 48 or portions thereof corresponding to the media stream from the media source 24 using the ordered list of pointers 116 contained in the playlist file 44 to reference locations of or within the media segment files 48. Finally, the media source 24 can serve the requested media segment files 48 or portions thereof to the client device 32 as the media stream.

The playlist and media segment files 44, 48 can be used to perform both normal speed forward playback and trickplay playback modes for the media being streamed. In FIG. 4A, the depicted playlist file 44.1 and media segment files 48.1, 48.2, 48.3 . . . can be utilized to perform a normal speed forward playback mode of a video component of the corresponding media stream. The playlist file 44.1 can thus include pointers 116 to a plurality of corresponding media segment files 48.1, 48.2, 48.3 . . . , the corresponding media segment files 48.1, 48.2, 48.3 . . . can include data defining each video frame of the video, and each media segment file 48.1, 48.2, 48.3 . . . can include data defining an ordered a plurality of video frames 120.1, 120.2, 120.3 . . . , including a plurality of different video frames types, such as I-frames 120.1, P-frames 120.2 and/or B-frames 120.3.

In FIG. 4B, the depicted playlist file 44.2 and media segment files 48.4, 48.5, 48.6 . . . can be utilized to perform a trickplay playback mode of a video component of the corresponding media stream. The playlist file 44.2 can include pointers to a plurality of corresponding media segment files 48.4, 48.5, 48.6 . . . or defined ranges within the media segment files 48.4, 48.5, 48.6 . . . , the corresponding media segment files 48.4, 48.5, 48.6 . . . or defined ranges within the media segment files 48.4, 48.5, 48.6 . . . can include data defining only a selected subset of the video frames 120.4, 120.5, 120.6 . . . of the video to provide the requested trickplay playback mode, and each media segment file 48.4, 48.5, 48.6 . . . or defined rage within the media segment file 48.4, 48.5, 48.6 . . . can include data defining a single video frame 120.4, 120.5, 120.6 . . . of the video, such as a single I-frame 120.4, 120.5, 120.6 . . . of the video.

Figure 5A:
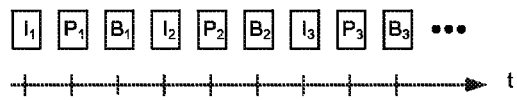
FIGS. 5A-5E are timeline diagrams depicting embodiments of video frame display timelines during normal speed forward playback and trickplay playback modes for a media stream.

FIG. 5A depicts an embodiment of a timeline of display of video frames by the media player program 72 during a normal speed forward playback of a video component of a media stream that can be produced utilizing playlist and media segment files 44, 48 of the type depicted in FIG. 4A. In the depicted timeline, the normal speed playback includes displaying each frame $I_1, P_1, B_1, I_2, P_2, B_2, I_3, P_3, B_3, \ldots$ of the video in order and at a predetermined rate of display.

Figure 5B:
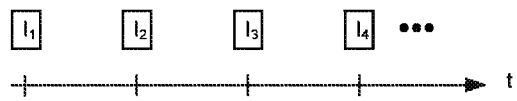
Figure 5C:
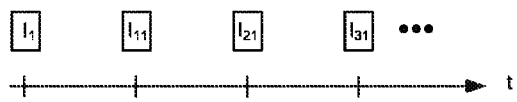
Figure 5D:
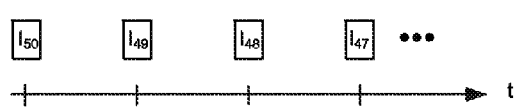
Figure 5E:
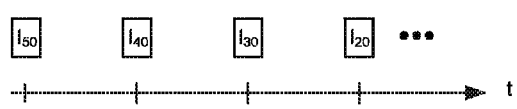

FIGS. 5B-5E depict embodiments of a timeline of display of video frames by the media player program 72 during various trickplay playback modes that can be produced by utilizing playlist and media segment files 44, 48 of the type depicted in FIG. 4B. FIG. 5B depicts an embodiment of a relatively slower speed fast forward playback mode that includes displaying only each I-frame $I_1, I_2, I_3, I_4 \ldots$ of the video in a forward order and at a predetermined rate of display. FIG. 5C depicts an embodiment of a relatively higher speed fast forward playback mode that includes displaying only a certain subset of the I-frames $I_1, I_{11}, I_{21}, I_{31} \ldots$ of the video in a forward order and at a predetermined rate of display. For example, as depicted, the higher speed fast forward playback mode can include displaying only one in every ten I-frames of the video. FIG. 5D depicts an embodiment of a relatively slower speed rewind playback mode that includes displaying only each I-frame $I_{50}, I_{49}, I_{48}, I_{47} \ldots$ of the video in a reverse order and at a predetermined rate of display. FIG. 5E depicts an embodiment of a relatively higher speed rewind playback mode that includes displaying only a certain subset of the I-frames $I_{50}, I_{40}, I_{30}, I_{20} \ldots$ of the video in a reverse order and at a predetermined rate of display. For example, as depicted, the higher speed rewind playback mode can include displaying only one in every ten I-frames of the video.

The media streaming system 20 can provide an improved method of, and corresponding systems and apparatus for, requesting video frames for trickplay playback for media streams, which reduces or eliminates undesirable effects on such playback of variable or unpredictable transmission and latency delays in responding to requests for media stream data from the media source 24 by the client devices 32.

Figure 6:
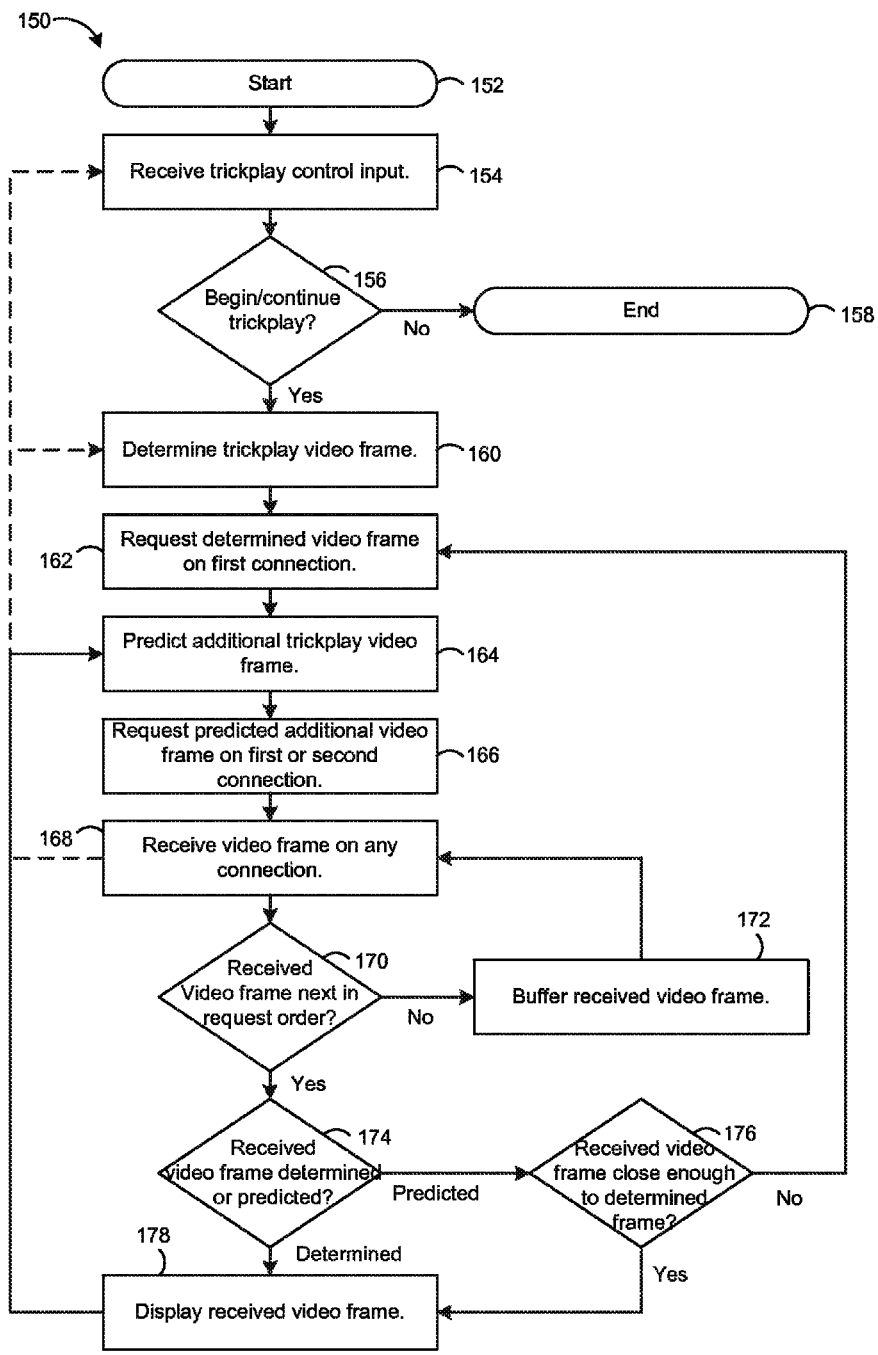
FIG. 6 is a flowchart depicting an embodiment of a method of requesting video frames for trickplay playback modes of a media stream.

FIG. 6 depicts an embodiment of the method 150 of requesting video frames for trickplay playback of media streams. The steps of the method of FIG. 6 can each be performed by one or more components of the media streaming system 20, such as by one more components of the client device 32, including by one or more components of the media player program 72 as executed by the processor 60 of the client device 32 and in conjunction with operation of the display 52, user interface 56, communication circuits 64 and storage component 68 of the client device 32. Note that trickplay playback mode, also referred herein to as enhanced playback mode, refers to any rewind or fastforward playback mode by the media streaming system 20. The method can begin at step 152.

A control input to control a trickplay playback mode can be received by the media player program 72 at step 154. The control input can be received from the user at one of the playback controls 96, 100, 104, 108, 112 of the user interface 88 of the media player program 72. Alternatively, the control input can be received by the media player program 72 as an automatically or responsively generated control input by one or more components of the client device 32, including various components of the media player program 72.

The received control input can be evaluated to determine if a trickplay playback mode is to begin or continue at step 156. The trickplay playback mode can begin in response to a control input to the rewind or fast forward playback controls 108, 112, such as during a normal speed forward playback mode, indicating that rewind or fast forward playback mode is to begin. The trickplay playback mode can continue in response to a control input to the rewind or fast forward playback controls 108, 112, such as during a trickplay playback mode, indicating a change from a rewind to a fast forward playback mode, or vice versa, or a change of a playback speed of a rewind or fast forward playback mode. The trickplay playback mode can end in response to a control input to the play, pause or stop playback controls 96, 104, 100 during a trickplay playback mode.

If the received control input indicates that trickplay playback mode is to end, at step 158 the method 150 can end.

If the received control input indicates that trickplay playback mode is to begin or continue, at step 160 a video frame can be determined for display during the trickplay playback. The determined video frame can be a video frame that will actually be displayed during the trickplay playback mode. The determined video frame can be a next video frame to display timewise during the trickplay playback mode or a future video frame to display during the trickplay playback mode. In one embodiment, instead of determining only a single video frame to display, a predetermined number of video frames can be determined at any given time for displaying during the trickplay display mode. The predetermined number can be selected, however, so as to preserve a responsiveness of the trickplay playback mode to the control input.

The video frame to display during trickplay playback can be determined based on various factors, including one or more of: the type of the trickplay playback mode indicated by the control input, the type of a playback mode being performed immediately prior to the control input, the identity or location in a playback timeline of a video frame previously displayed during the current or a previous trickplay playback mode, the identity or location in a playback timeline of a video frame previously displayed during a previous normal speed forward playback mode, the identity or location in a playback timeline of video frames stored in a video buffer by the media player program 72 to perform the current or a previous trickplay playback mode, the identity or location in a playback timeline of video frames stored in a video buffer by the media player program 72 to perform a previous normal speed forward playback mode, or the content of one or more playlists 44 corresponding to one or more of normal speed forward playback or trickplay playback modes of the media stream.

In one example, using the exemplary timelines of FIGS. 5A-5B, for a control input indicating the relatively slow speed fast forward playback mode received immediately after displaying a video frame I1 during normal speed forward playback mode, it can be determined that a next video frame to display is video frame I2. In another example, using the exemplary timelines of FIGS. 5D-5E, for a control input indicating a change to the relatively fast rewind playback mode received immediately after displaying a video frame I49 during the relatively slow rewind playback mode, it can be determined that a next video frame to display is video frame I40.

Note that step 160 can be performed part of an ongoing process of the media player program 72 of determining the next video frame to display during the trickplay playback mode. Although the method 150 can move on to step 162 after the one or predetermined number of video frames to display during the trickplay display mode is/are determined, the process by the media player 72 to determine video frames to display during the trickplay playback mode can continue in an ongoing fashion at a rate as a function of the rate of actually displaying video frames during the trickplay playback mode and so as to preserve the responsiveness of the trickplay playback mode to the control input.

The determined video frame can be requested by the client device 32 from the media source 24 using a first connection between the client device 32 and the media source 24 over the network 28 at step 162. The media program player 72 can formulate the request for the determined video frame using a playlist file 44 corresponding to the trickplay playback mode indicated by the control input.

That is, upon determining the identity of the video frame to display, the media player program 72 can consult the corresponding playlist file 44 to determine the location at the media source 24 of the determined video frame, and formulate a request for the determined video frame directed to that location.

The first connection between the client device 32 and the media source 24 can be a connection of various different connection types. In one embodiment, the connection can be a Transmission Control Protocol (TCP) connection between the client device 32 and the media source 24. In other embodiments, the connection can be a User Datagram Protocol (UDP) connection between the client device 32 and the media source 24, a Stream Control Transmission Protocol (SCTP) connection between the client device 32 and the media source 24, or another type of connection between the client device 32 and the media source 24.

The request can be formatted and sent by the client device 32 to the media source 24 over the first connection according to and utilizing the features of the Hypertext Transfer Protocol (HTTP), such as HTTP version 1.1.

One or more additional video frames to potentially be displayed during the trickplay playback mode can be predicted at step 164. The predicted video frame can be a video frame that the method predicts will be displayed during the trickplay playback mode after displaying the one or predetermined number of video frames that have been determined to be displayed at step 160. The method 150 predicts the one or more additional video frames in order to request the predicted one or more frames at an earlier time in an effort to minimize the effects of the variable or unpredictable transmission and latency delays associated with the media source 24 and/or network 28. The method 150 may subsequently actually display the predicted video frame(s) if it is sufficiently close in identity and/or location within the relevant trickplay playback timeline to a video frame that the media player program 72 eventually determines that it will display at a time corresponding to the intended display of the predicted frame. However, the method 150 may also subsequently not actually display the predicted video frame if is not sufficiently close in identity and/or location within the relevant trickplay playback timeline to the video frame that the media player program 72 determines that it will display at the corresponding time.

The one or more additional video frames can be predicted based on various factors, including one or more of the factors discussed above as used to determine the video frame to display during trickplay playback and/or the following additional factors: the type of trickplay control inputs received prior to the most recently received control input, the rate of receipt of trickplay control inputs, or the rate of change of the rate of receipt of trickplay control inputs.

In one example, using the exemplary timelines of FIGS. 5A-5B, for a control input indicating the relatively slow speed fast forward playback mode received immediately after displaying a video frame I1 during normal speed forward playback mode, it can be determined that a next video frame to display is video frame I2 and predicted that an additional video frame that may be displayed is video frame I3. In another example, using the exemplary timelines of FIGS. 5A-5C, for a first control input indicating the relatively slow speed fast forward playback mode received immediately after displaying a video frame I1 during normal speed forward playback mode, followed shortly thereafter by a second control input indicating the relatively high speed playback mode, it can be determined that a next video frame to display is video frame I2 and predicted that an additional video frame that may be displayed is video frame I11 or video frame I21.

The one or more predicted video frames can be requested by the client device 32 from the media source 24 using either the first connection or one or more additional connections between the client device 32 and the media source 24 over the network 28 at step 166. The predicted video frame(s) can be requested before receiving any response to the request for the determined video frame(s). The media program player 72 can again formulate the request for the predicted video frame using the playlist file 44 corresponding to the trickplay playback mode indicated by the control input. That is, similar to as discussed above for the determined video frame, upon predicting the identity of the video frame to potentially display, the media player program 72 can consult the corresponding playlist file 44 to determine the location at the media source 32 of the predicted video frame, and formulate a request for the predicted video frame directed at that location.

As with the first connection between the client device 32 and the media source 24, the one or more additional connections between the client device 32 and the media source 24 can be one or more connections of various different connection types. In one embodiment, the one or more additional connection can be one or more additional TCP connections between the client device 32 and the media source 24. In other embodiments, the one or more additional connection can be one or more UDP connections between the client device 32 and the media source 24, one or more SCTP connections between the client device 32 and the media source 24, a mixture of TCP, UDP or SCTP connections between the client device 32 and the media source 24, or one or more other types of connections between the client device 32 and the media source 24. Also, the first connection and the one or more additional connections can be of the same or different connection types.

The request can also again be formatted and sent by the client device 32 to the media source 24 over the first or one or more additional connections according to and utilizing the features of HTTP, such as HTTP version 1.1.

Figure 7A:
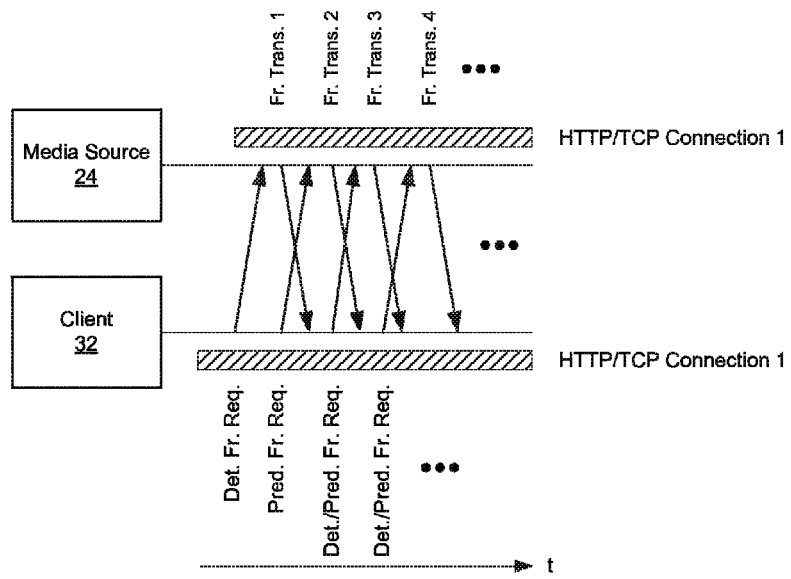
FIGS. 7A-7B are partially schematic, partially timeline diagrams depicting embodiments of media stream data transmissions over one or more connections between a media source and client device of the media streaming system.
Figure 7B:
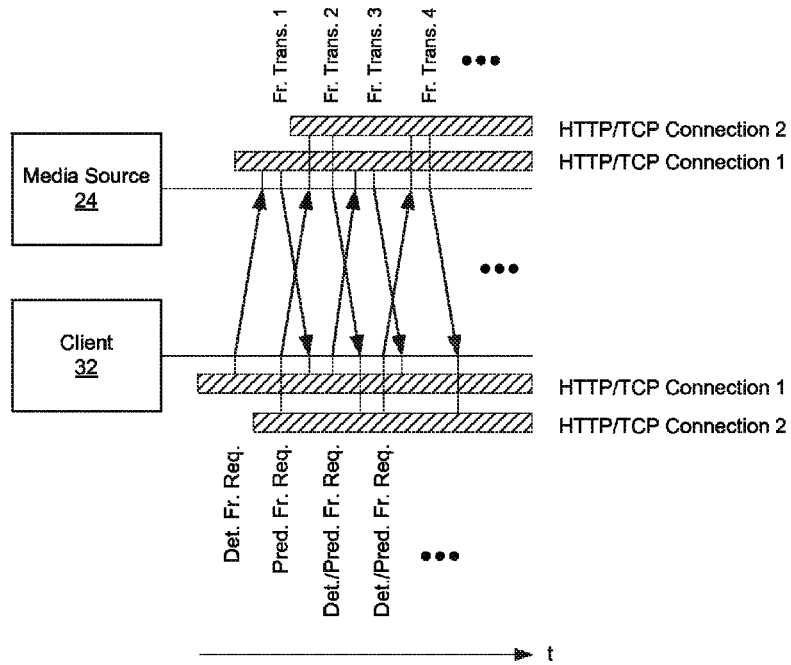

FIGS. 7A-7B depict embodiments of timelines of exemplary TCP connections and corresponding media stream data transmissions between the media source 24 and client device 32 during exemplary performances of the method 150. In the embodiment of FIG. 7A, the determined and predicted video frames can both be requested using a single HTTP/TCP connection. A determined first video frame is initially requested using the HTTP/TCP connection and then a predicted second video frame is requested using the same HTTP/TCP connection before receiving the requested first video frame on the HTTP/TCP connection. Eventually, the requested video frames start arriving over the HTTP/TCP connection, with the requested first video frame arriving after requesting the predicted second video frame.

In the embodiment of FIG. 7B, the determined and predicted video frames can be requested using two different HTTP/TCP connections. A determined first video frame is initially requested using a first HTTP/TCP connection and then a predicted second video frame is requested using a second HTTP/TCP connection before receiving the requested first video frame on the first HTTP/TCP connection. Eventually, the requested video frames start arriving over the HTTP/TCP connections, with the requested first video frame arriving over the first HTTP/TCP connection after requesting the predicted second video frame.

Returning to FIG. 6, a requested video frame arrives at the client device 32 from the media source 24 over the connection on which it was requested at step 168.

It can be determined whether the received video frame is the next video frame in the order in which the video frames where requested at step 170. In embodiments utilizing only a single connection to request the determined and predicted video frames, the video frames may be received in the same order in which they were requested, as the single connection may respond to requests in the order that the requests were made, unless an error occurs that changes this response order. In embodiments utilizing more than one connection to request the determined and predicted video frames, the video frames may be received in an order different from the order in which they were requested, as different connections may exhibit different transmission or latency delays at any given moment. Note that the order of the receiving the requested determined and predicted video frames is thus not limited to the exemplary embodiments depicted in FIGS. 7A-7B.

If the received video frame is not the next video frame in the request order, then at step 172 the received video frame can be buffered until it is the next video frame in the request order and the method can return to step 168.

If the received video frame is the next video frame in the request order, then at step 174 it can be determined whether the received frame is a determined video frame (i.e., was determined at step 160 as video frame that will actually be displayed during the trickplay playback mode) or a predicted video frame (i.e., was predicted at step 164 to be a video frame that may be displayed during the trickplay playback mode). The received video frame can be identified as a determined or predicted video frame based on the history of which requested video frames were determined at step 160 or predicted at step 164.

If the received video frame is determined to be a video frame that was determined at step 160 to be a video frame that will actually be displayed during the trickplay playback mode, then at step 178 the received frame can be displayed during the trickplay playback mode.

If the received video frame is a video frame that was predicted at step 164 to be a video frame that may be displayed during the trickplay playback mode, then at step 176 it can be determined whether the received predicted video frame is sufficiently close in identity or location within the relevant trickplay playback timeline to a video frame that the media player program 72 ultimately determines that it should display at a time corresponding to the intended display of the predicted video frame. As discussed above, the media player program 72 can conduct an ongoing process of determining the next video frame to display during the trickplay playback mode in coordination with actually displaying video frames during the trickplay playback mode. Whether the received predicted video frame is sufficiently close to the video frame that the media player program 72 ultimately determines that it should display at the corresponding time can be determined by comparing the identity and/or location within the relevant trickplay playback timeline of the received predicted video frame with the identity and/or location within the relevant trickplay playback timeline of the corresponding actually determined video frame. If the predicted video frame is within a predetermined number of frames of the corresponding determined video frame within the relevant trickplay playback timeline, it can be determined that the received predicted video frame is sufficiently close to the video frame that the media player program 72 ultimately determined that it should display at the corresponding time. If the predicted video frame is not within the predetermined number of frames of the corresponding determined video frame within the relevant trickplay playback timeline, it can be determined that the received predicted video frame is not sufficiently close to the video frame that the media player program 72 ultimately determined that it should display at the corresponding time.

If the received predicted video frame is determined to be close enough to the video frame that the media player program 72 ultimately determined that it should display at the corresponding time, at step 178 the received predicted video frame can be displayed instead of the video frame that the media player program eventually determined should be displayed.

If the received predicted video frame is determined to be not close enough to the video frame that the media player program 72 ultimately determined that it should display at the corresponding time, the predicted video frame can be bypassed and the method 150 can return to step 162 at which the video frame that the media player program 72 ultimately determined that it should display at the corresponding time can be requested by the client device 32 from the media source 24 over one of the connections.

In an alternative embodiment of the method, the determination at step 176, as to whether a predicted video frame is close enough to the video frame that the media player program 72 ultimately determined that it should display at the corresponding time, can be performed before the predicted video frame is received at step 170. In such an embodiment, if the predicted video frame is determined to be close enough to the video frame that the media player program 72 ultimately determined should be displayed at the corresponding time, the predicted video frame can be displayed after it is received instead of the video frame that the media player program determined should be displayed. If the predicted video frame is determined to be not close enough to the video frame that the media player program 72 ultimately determined should be displayed at the corresponding time, the request for the predicted video frame can be aborted and the method 150 can return to step 162, at which the video frame that the media player program 72 ultimately determined should be displayed at the corresponding time can be requested by the client device 32 from the media source 24 over one of the connections.

Embodiments of the method 150 of FIG. 6 can repeat until a control input is received at step 154 that is determined at step 156 to end the trickplay playback mode. Thus, upon displaying the received video frame at step 178 (or alternatively optionally upon receiving a video frame at step 168), the method 150 can return to various different previous steps. For example, the method 150 can optionally return to either step 164, at which one or more additional video frames can be predicted, or to step 160, at which one or more additional video frames can be determined. The decision as to whether to return to steps 164 or 160 to predict or determine additional video frames, respectively, and the rate at which to so determine or predict, can be made so as to maintain requests for one or a predetermined number determined video frames still to be displayed and one or a predetermined number of predicted video frames that may be displayed. In the exemplary embodiment of FIGS. 7A-7B, the third and succeeding frames requested can thus either be a determined or predicted video frame. In one embodiment, once an initial one or predetermined number of video frames are determined in step 160 and requested, the method always returns to step 164 from step 178 to predict further video frames. Although, even in such an embodiment, as discussed above the media player program continues to conduct the process of determining the next video frame to display during the trickplay playback mode in coordination with actually displaying video frames during the trickplay playback mode.

Further trickplay control inputs can also be received at any time during performance of the method 150, and in response the method 150 can return to step 154.

Figure 8A:
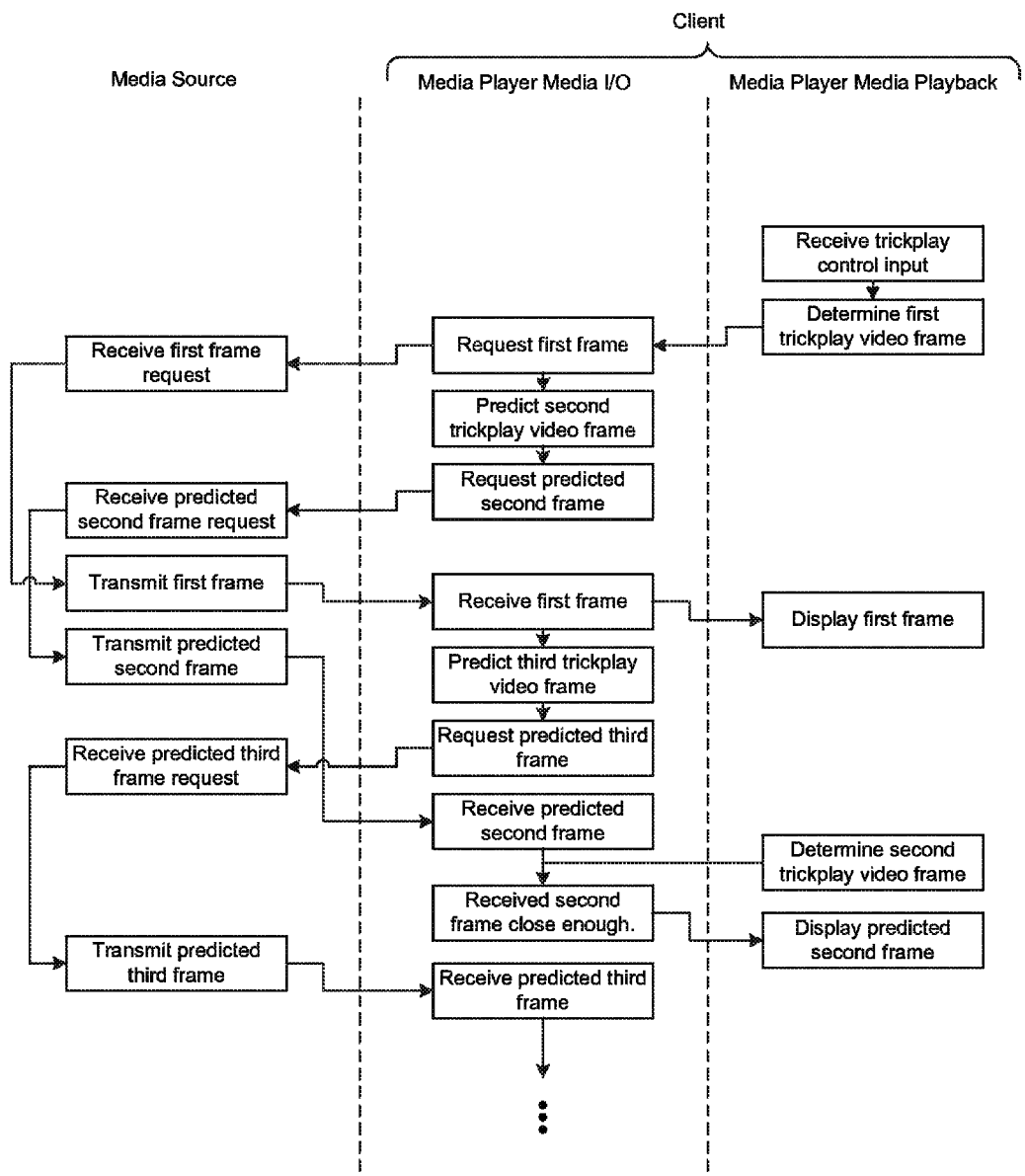
FIGS. 8A-8C are state-diagram flowcharts depicting embodiments of performances of the method of FIG. 6.
Figure 8B:
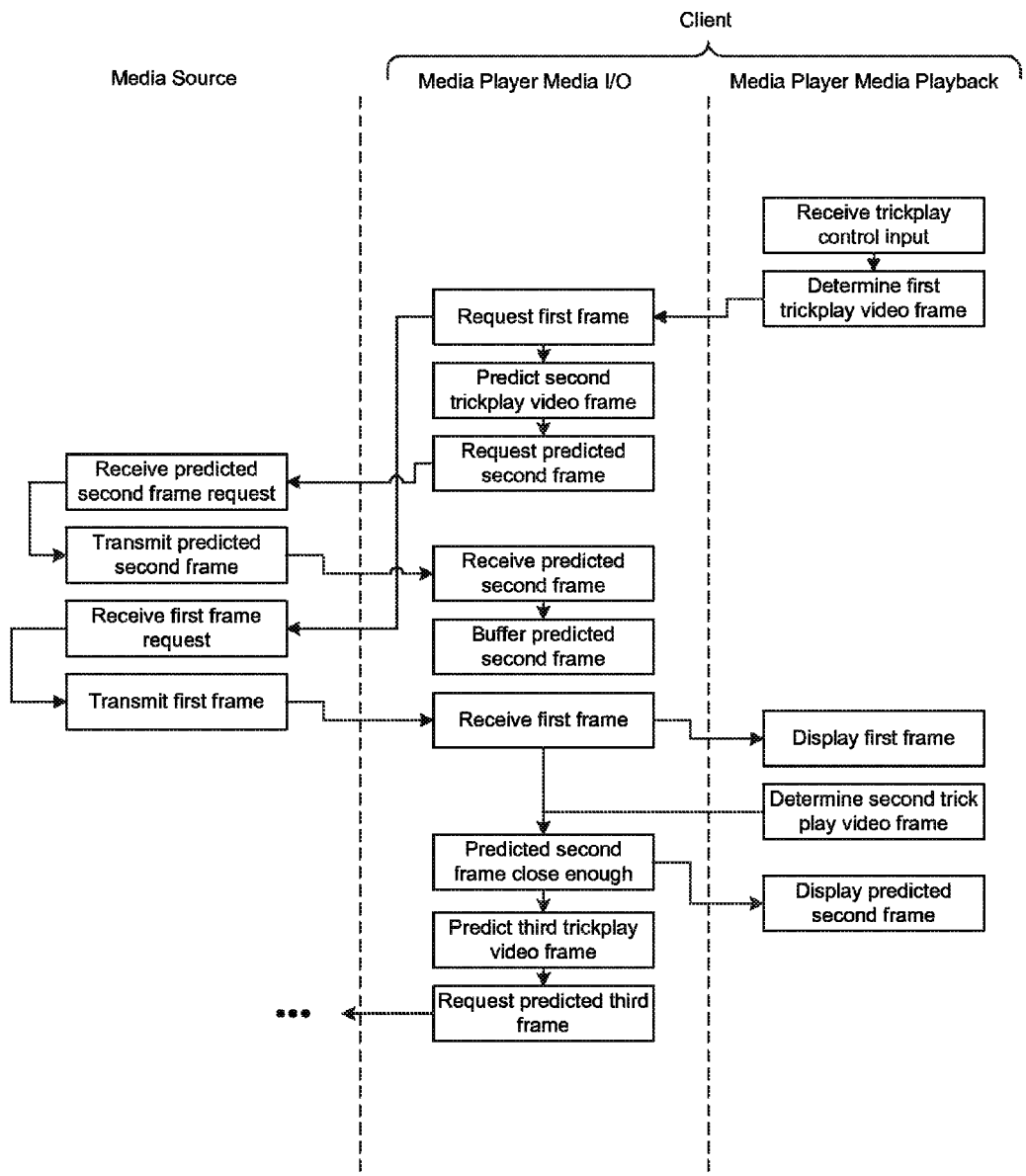
Figure 8C:
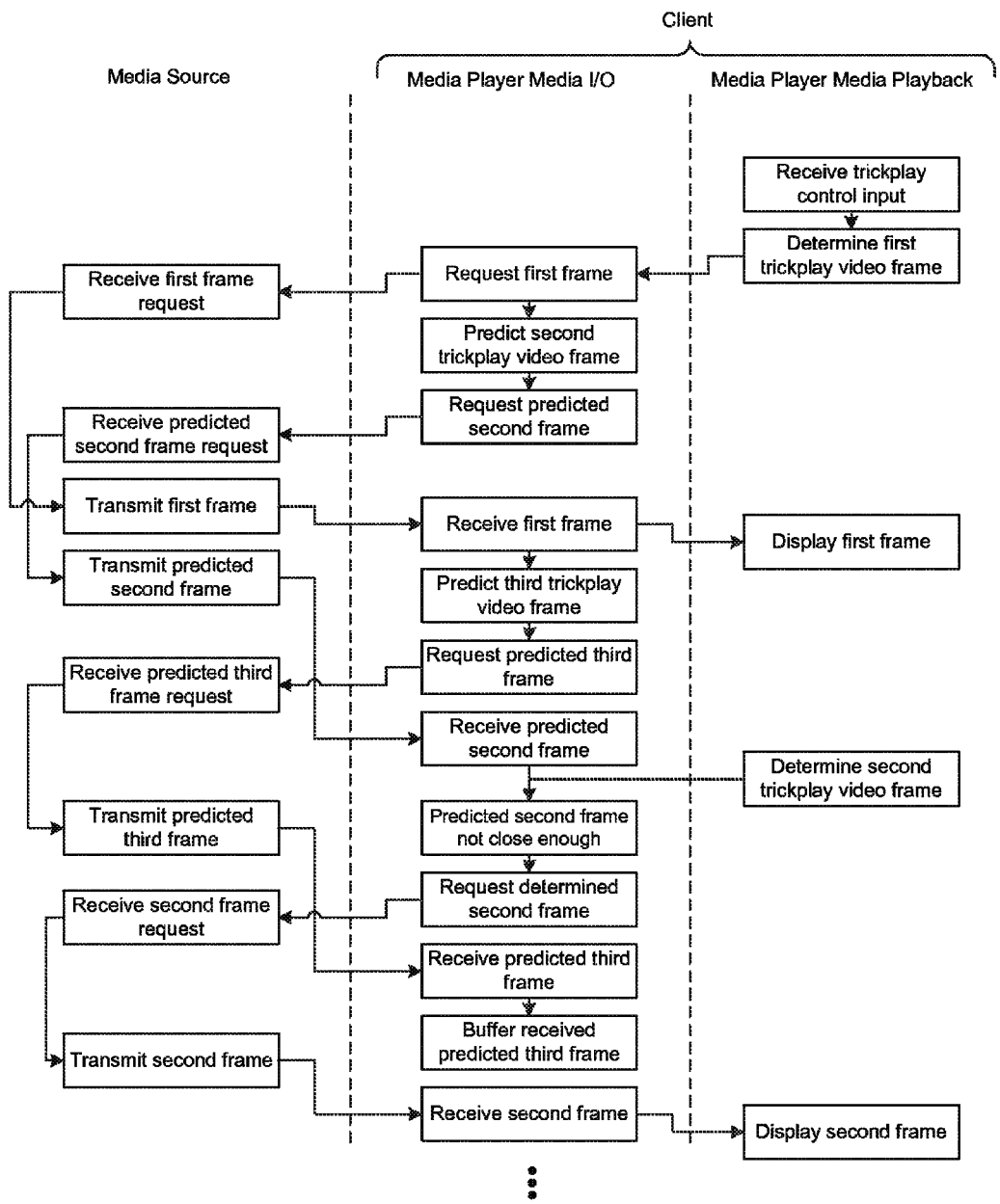

Performance of the method of FIG. 6 may therefore result in various different operational scenarios occurring. FIGS. 8A-8C depict embodiments of exemplary scenarios resulting from the performance of the method. In FIG. 8A, at the client device 32, upon receiving a control input, a first video frame is determined and requested; a second video frame is then predicted and requested; the first determined video frame is then received before the second predicted video frame and displayed; upon receipt and display of the first determined frame, a third video frame is then predicted and requested; the second predicted video frame is then received and determined to be close enough to a determined second frame and displayed; the third predicted video frame is then received; etc.

In FIG. 8B, at the client device 32, upon receiving a control input, a first video frame is determined and requested; a second video frame is then predicted and requested; the second predicted video frame is then received before the first determined video frame and buffered; the first determined video frame is then received and displayed; upon receipt and display of the first determined frame, the second predicted video frame is then determined to be close enough to a determined second frame and displayed; a third video frame is then predicted and requested; etc.

In FIG. 8C, at the client device 32, upon receiving a control input, a first video frame is determined and requested; a second video frame is then predicted and requested; the first determined video frame is then received before the second predicted video frame and displayed; upon receipt and display of the first determined frame, a third video frame is then predicted and requested; the second predicted video frame is then received and determined to be not close enough to a determined second frame and so the determined second frame is requested; the third predicted video frame is then received before the determined second frame and buffered; the determined second frame is then received and displayed; etc.

Note that the media streaming system 20 and method 150 can optionally utilize media files having forms other than the playlist and media segment files discussed herein.

Additional embodiments of the media streaming system 20 and method 150 are possible. For example, any feature of any of the embodiments of the media streaming system 20 and method 150 described herein can optionally be used in any other embodiment of the media streaming system 20 and method 150. Also, embodiments of the media streaming system 150 and method 150 can optionally include only a subset or ordering of the components or features of the media streaming system 20 and method 150 described herein. For example, embodiments of the method 150 can optionally include only a subset of the steps described herein and omit the other steps. In another example, embodiments of the method 150 can optionally perform the steps or only a subset of the steps described herein in various different orders.

What is claimed is:

1. A method of requesting and receiving a media stream, the method comprising:

responsive to a control input to control an enhanced playback mode for a media stream, determining, by a computing device, a first video frame to be displayed based on the enhanced playback mode;

receiving, by the computing device, the first video frame from a media source on a network over a first communication connection between the computing device and the media source;

predicting, by the computing device, a video frame likely to be displayed based on the enhanced playback mode and at least one other factor;

requesting, by the computing device, the predicted video frame from the media source over a second communication connection between the computing device and the media source before receiving, by the computing device, the first video frame over the first communication connection;

receiving, by the computing device, the predicted video frame from the media source over the second communication connection;

determining, by the computing device, an additional video frame to be displayed based on the enhanced playback mode;

determining, by the computing device, whether a distance between a frame location of the predicted video frame and a frame location of the determined additional video frame is less than a predetermined distance;

when the distance between the frame location of the predicted video frame and the frame location of the determined additional video frame is less than the predetermined distance, displaying, by the computing device, the predicted video frame; and when the distance between the frame location of the predicted video frame and the frame location of the determined additional video frame is not less than the predetermined distance:

receiving the determined additional video frame over the first communication connection; and displaying, by the computing device, the determined additional video frame.

2. The method of claim 1, wherein the receiving the first video frame and the requesting the predicted video frame utilize Hypertext Transfer Protocol (HTTP) over at least one Transmission Control Protocol (TCP) connection.

3. The method of claim 1, wherein the control input at least one of:

begins the enhanced playback mode, or changes a playback speed of at least one of the enhanced playback mode.

4. The method of claim 1, further comprising:

displaying, by the computing device, the first video frame during the enhanced playback mode.

5. The method of claim 1, wherein the receiving of the predicted video frame occurs before the receiving of the first video frame, and the method further comprises buffering the received predicted video frame until the receiving of the first video frame.

6. The method of claim 1, wherein the predicting of the video frame predicts the video frame based on at least one of:

a type of the enhanced playback mode indicated by the control input, a type of a playback mode being performed immediately prior to the receiving of the control input, a location within a playback timeline of a video frame previously displayed during an enhanced playback mode, a location within a playback timeline of a video frame previously displayed during a previous normal speed forward playback mode, a location within a playback timeline of video frames stored in a video buffer of the computing device to perform an enhanced playback mode, a location within a playback timeline of video frames stored in a video buffer of the computing device to perform a previous normal speed forward playback mode, or content of one or more playlists corresponding to one or more of normal speed forward or enhanced playback modes of the media stream.

7. The method of claim 1, wherein the computing device includes at least one of: a desktop computer, a laptop computer, a tablet computer, or a smartphone.

8. The method of claim 1, wherein the predicted video frame and additional video frame have different frame locations.

9. A non-transitory machine-readable medium having program instructions, which when executed by a processor perform a method of requesting and receiving a media stream, the method comprising:

responsive to a control input to control an enhanced playback mode for a media stream, determining, by a computing device, a first video frame to be displayed based on the enhanced playback mode;

receiving, by the computing device, the first video frame from a media source on a network over a first communication connection between the computing device and the media source;

predicting, by the computing device, a video frame likely to be played based on the enhanced playback mode and at least one other factor;

requesting, by the computing device, the predicted video frame from the media source over a second communication connection between the computing device and the media source before receiving, by the computing device, the first video frame over the first communication connection;

receiving, by the computing device, the predicted video frame from the media source over the second communication connection;

determining, by the computing device, an additional video frame to be displayed based on the enhanced playback mode;

determining, by the computing device, whether a distance between a frame location of the predicted video frame a frame location of the determined additional video frame is less than a predetermined distance;

when the distance between the frame location of the predicted video frame and the frame location of the determined additional video frame is less than the predetermined distance, displaying, by the computing device, the predicted video frame; and when the distance between the frame location of the predicted video frame and the frame location of the determined additional video frame is not less than the predetermined distance:

receiving the determined additional video frame over the first communication connection; and displaying, by the computing device, the determined additional video frame.

10. The non-transitory machine-readable medium of claim 9, wherein the receiving the first video frame and the requesting the predicted video frame utilize Hypertext Transfer Protocol (HTTP) over at least one Transmission Control Protocol (TCP) connection.

11. The non-transitory machine-readable medium of claim 9, wherein the predicted video frame and additional video frame have different frame locations.

12. The non-transitory machine-readable medium of claim 9, wherein the receiving of the predicted video frame occurs before the receiving of the first video frame, and the method further comprises buffering the received predicted video frame until the receiving of the first video frame.

13. The non-transitory machine-readable medium of claim 9, wherein the predicting of the video frame predicts the video frame based on at least one of:

a type of the enhanced playback mode indicated by the control input, a type of a playback mode being performed immediately prior to the receiving of the control input, a location within a playback timeline of a video frame previously displayed during an enhanced playback mode, a location within a playback timeline of a video frame previously displayed during a previous normal speed forward playback mode, a location within a playback timeline of video frames stored in a video buffer of the computing device to perform an enhanced playback mode, a location within a playback timeline of video frames stored in a video buffer of the computing device to perform a previous normal speed forward playback mode, or content of one or more playlists corresponding to one or more of normal speed forward or enhanced playback modes of the media stream.

14. A computing device, comprising:

a display;

a processor;

a user interface; and a storage component having program instructions, which when executed by the processor perform a method of requesting and receiving a media stream, the method including:

responsive to a control input to control an enhanced playback mode for the media stream, determining a first video frame to be displayed based on the enhanced playback mode;

receiving the first video frame from a media source on a network over a first communication connection between the computing device and the media source;

predicting a video frame likely to be displayed based on the enhanced playback mode and at least one other factor;

requesting the predicted video frame from the media source over a second communication connection between the computing device and the media source before receiving the determined video frame over the first communication connection;

receiving the predicted video frame from the media source over the second communication connection;

determining an additional video frame to be displayed based on the enhanced playback mode;

determining whether a distance between a frame location of the predicted video frame and a frame location of the determined additional video frame is less than a predetermined distance;

when the distance between the frame location of the predicted video frame and the frame location of the determined additional video frame is less than the predetermined distance, displaying the predicted video frame; and when the distance between the frame location of the predicted video frame and the frame location of the determined additional video frame is not less than the predetermined distance:

receiving the determined additional video frame over the first communication connection; and displaying, by the computing device, the additional video frame.

15. The computing device of claim 14, wherein the receiving the first video frame and the requesting the predicted video frame utilize Hypertext Transfer Protocol (HTTP) over at least one Transmission Control Protocol (TCP) connection.

16. The computing device of claim 15, wherein the predicted video frame and additional video frame have different frame locations.

17. The computing device of claim 15, wherein the receiving of the predicted video frame occurs before the receiving of the first video frame, and the method further comprises buffering the received predicted video frame until the receiving of the first video frame.

18. The computing device of claim 15, wherein the predicting of the video frame predicts the video frame based on at least one of:

a type of the enhanced playback mode indicated by the control input, a type of a playback mode being performed immediately prior to the receiving of the control input, a location within a playback timeline of a video frame previously displayed during an enhanced playback mode, a location within a playback timeline of a video frame previously displayed during a previous normal speed forward playback mode, a location within a playback timeline of video frames stored in a video buffer of the computing device to perform an enhanced playback mode, a location within a playback timeline of video frames stored in a video buffer of the computing device to perform a previous normal speed forward playback mode, or content of one or more playlists corresponding to one or more of normal speed forward or enhanced playback modes of the media stream.

19. The computing device of claim 15, wherein the computing device further comprises at least one of: a desktop computer, a laptop computer, a tablet computer, or a smartphone.

* * * * *